(12) United States Patent
Daniel et al.

(10) Patent No.: US 8,079,033 B2
(45) Date of Patent: Dec. 13, 2011

(54) SYSTEM AND METHOD FOR BALANCING INFORMATION LOADS

(75) Inventors: Jerome Daniel, Grasse (FR); Cyril Deguet, Juan-les-Pins (FR)

(73) Assignee: Amadeus SAS, Biot (FR)

( * ) Notice: Subject to any disclaimer, the term of this patent is extended or adjusted under 35 U.S.C. 154(b) by 1332 days.

(21) Appl. No.: 11/707,870

(22) Filed: Feb. 20, 2007

(65) Prior Publication Data

US 2008/0201719 A1   Aug. 21, 2008

(51) Int. Cl.
*G06F 9/46* (2006.01)
(52) U.S. Cl. .................................. 718/101; 718/105
(58) Field of Classification Search .................. None
See application file for complete search history.

(56) References Cited

U.S. PATENT DOCUMENTS

| | | | |
|---|---|---|---|
| 2002/0149588 A1* | 10/2002 | Babcock ...................... | 345/468 |
| 2003/0233472 A1 | 12/2003 | Tundlam et al. | |
| 2004/0111529 A1 | 6/2004 | Parmar | |
| 2004/0267930 A1 | 12/2004 | Giulio et al. | |
| 2005/0114480 A1 | 5/2005 | Ramamoorthy | |
| 2005/0120095 A1 | 6/2005 | Aman et al. | |
| 2005/0155032 A1 | 7/2005 | Schantz | |
| 2005/0235126 A1 | 10/2005 | Ko et al. | |
| 2005/0259632 A1 | 11/2005 | Malpani et al. | |
| 2007/0223377 A1* | 9/2007 | de Heer ........................ | 370/235 |

OTHER PUBLICATIONS

PCT Search Report, Jul. 23, 2008.

\* cited by examiner

*Primary Examiner* — Meng An
*Assistant Examiner* — Eric Wai
(74) *Attorney, Agent, or Firm* — Steptoe & Johnson LLP

(57) ABSTRACT

A method and system is provided for routing data in a system. The method includes determining an initial fixed distribution pattern, determining a queue parameter based on at least a current amount of system use and a maximum potential system use, determining a time parameter based on the time that a message in the application has been waiting for its processing, determining a load parameter based on at least the time parameter and the queue parameter, and modifying the distribution pattern based on at least the load parameter.

15 Claims, 3 Drawing Sheets

SYSTEM AND METHOD FOR BALANCING INFORMATION LOADS

BACKGROUND OF THE INVENTION

1. Field of the Invention

The present invention relates to dynamic load balancing and throttling mechanisms. More specifically, the present invention relates to a load-factor reported by the targeted application that influences a load-balancing algorithm in real time.

2. Discussion of Background Information

Load balancing in an Enterprise Services Bus (ESB) entails two characteristics: a destination and the route. A route can distribute the traffic to several destinations. The ESB settings allow for allocating load-balancing weights to the destinations targeted by a route. For example, for a given route, two destinations can be weighted with 6 and 4, respectively. Based on this weighting, 60% of the traffic will be routed to the first destination, and 40% to the other. This type of load balancing is called static load balancing. Such static load balancing is not responsive to needs of the underlying system.

SUMMARY OF THE INVENTION

According to an embodiment of the invention, a method for routing data in a system is provided. The method includes determining an initial fixed distribution pattern, determining a queue parameter based on at least a current amount of system use and a maximum potential system use, determining a time parameter based on the time that a message in the application has been waiting for its processing, determining a load parameter based on at least the time parameter and the queue parameter, and modifying the distribution pattern based on at least the load parameter.

The above embodiment may have various optional features. The determining a time parameter, the determining a load parameter, and the modifying may be recursive. The modifying can be in response to changes in the system on a substantially real time basis. The method may disregard messages matching predetermined criteria during periods of system overload. The method may rely upon a line-drawing Bresenham algorithm to compute in substantially real time a distribution of messages. The modifying may further comprise applying the formula:

$$N_i \leq k \frac{w_i}{\sum w_i}$$

where k is the number of messages already received by the ESB, $N_i$ is the number of messages already sent to the destination i, and $W_i$ is the weight of destination i.

The determining a queue parameter of the above features may comprise applying the formula:

$$LFq = QUP/HLFM$$

where LFq is the initial queue load factor, HLFM is a preset percentage of the maximum number of messages that a queue can process, and QUP represents the number of messages in the queue as compared to its capacity. The queue parameter may be based on the initial load factor. The determining a queue parameter may comprise setting the queue parameter to the initial queue load factor when the initial load factor is within a certain range, setting the queue parameter to a predetermined value when the initial load factor is below a certain range, and/or setting the queue parameter to a predetermined value based on at least when the initial load factor is above a certain range.

The determining the time parameter of the above features may comprise applying the formula:

$$LFet = (ATT - TTT)/TTS$$

where ATT is calculated based on the average transaction time computed by the application, Transaction Time Threshold is a predetermined minimum time, and Transaction Time Scale is a configurable parameter that defines how fast the load factor reacts to an increase in transaction time. The time parameter may be based on the initial existence time factor. The determining a time parameter may comprise setting the time parameter to the initial existence time factor when the initial existence time factor is within a certain range, and/or setting the time parameter to a predetermined value when the initial existence time factor is below a certain range. The modifying may be based on at least a combination of the time parameter and the queue parameter, or a weighted combination of the time parameter and the queue parameter.

According to another embodiment of the invention, a method for routing data in a system is provided. The method includes determining an initial distribution pattern, determining a queue parameter, determining a time parameter, determining a load parameter based on combination of the time parameter and the queue parameter; and modifying the distribution pattern based on the following formula:

$$Wd(i) = Ws(i)(1 - LF(i))$$

where: Ws(i) is a weight as set by the initial distribution pattern for a particular destination P(i) in a route, LF(i) is the load parameter for the particular destination, and Wd(i) is the updated weight for revising the distribution pattern.

The above embodiment may have various optional features. The load parameter can be based on at least a combination of the time parameter and the queue parameter, or at least a weighted combination of the time parameter and the queue parameter. The method may further include determining a period of system overload and disregarding, during the period, messages that match predetermined criteria. The method may rely upon a line-drawing Bresenham algorithm to compute in substantially real time a distribution of messages. The modifying may further comprise applying the formula:

$$N_i \leq k \frac{w_i}{\sum w_i}$$

where k is the number of messages already received by the ESB, Ni is the number of messages already sent to the destination i, and and Wi is the weight of destination i.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE EXEMPLARY EMBODIMENT

Figure 1:
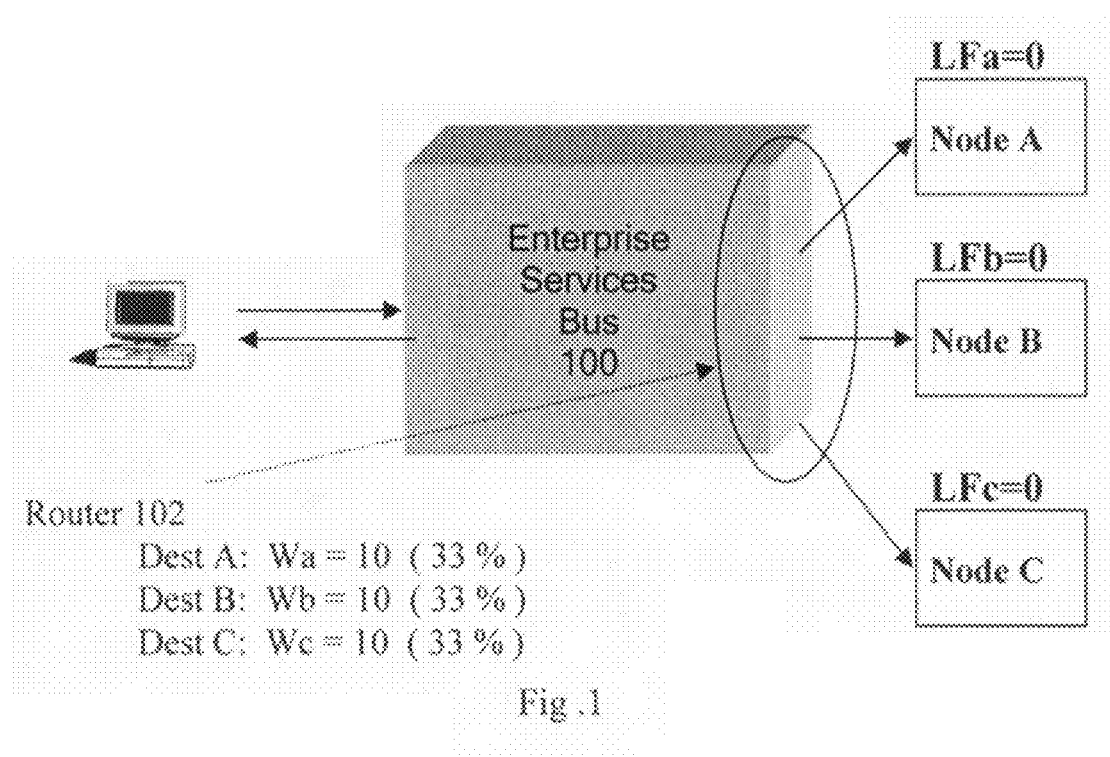
FIG. 1 is an overview of an embodiment of the invention with equal load factors.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Dynamic load balancing entails changing the distribution of static load balancing based on the behavior of the target site at the destination. The target site and the network exchange a load-factor real time that represents the loads evolution at the target site. This load-factor is used to update distribution weights. The load-balancing methodology of the preferred embodiment is preferably implemented as part of an Enterprise Services Bus (ESB), although it is equally applicable to other environments.

Preferably there is some minimum rate at which the load-factor updates. By way of non-limiting example, the minimum time between two load-factor exchanges could be set to 1 second. Any appropriate minimum time could be selected with a corresponding update of load factors in substantially real time. As long as the ESB does not receive a new load factor, it assumes that the load factor remains unchanged.

The load factor of a given application affects the static weight $Ws(i)$ of the corresponding destination ($Pi$) in the route. If the load factor is considered as a value between 0 and 1 (or a corresponding percentage), then dynamic weight $Wd(i)$ for the destination will be:

$$Wd(i)=Ws(i)(1-LF(i))$$

Occasionally the target site may be so overloaded ($LF(i)=1$) that it does not send load factor updates. The ESB will therefore not receive messages until the load-factor decreases, whatever its static weight is. If messages are not being sent, the overall routing algorithm thus remains the same, whether dynamic load balancing is used or not. A more efficient Bresenham-based algorithm can be used to avoid heavy floating point calculations each time the load factors are updated.

The load factor is preferably computed on the application side and based on at least two criteria: (1) the number of messages queued waiting to be processed, and (2) the average existence time. The weight of these two sub factors can be configured for the calculation of the global node load factor.

The first factor is calculated based on the number of messages waiting to be processed. For this calculation, a "high load factor watermark" is user or operator defined preset percentage of the maximum number of messages that a queue can process, and a "queue usage percentage" represents the number of messages in the queue as compared to its capacity.

The preliminary queue load factor is accordingly calculated as follows:

$$LFq=QUP/HLFM$$

where:
LFq is the preliminary queue load factor;
QUP is the Queue Usage Percentage; and
HLFM is the High Load Factor Watermark.

In most cases, the preliminary queue load factor will be the final queue load factor. There are preferably exceptions, however, particularly near the upper and lower limits of potential values for LFq. Two such exceptions are as follows:

When the preliminary LFq is below a minimum percentage, the final LFq is set to a minimum value. Non-limiting examples of the minimum percentage is 10%, and the minimum value is 0.

When QUP=HLF, then LFq reaches its maximum value. If the preliminary LFq is still greater than a maximum percentage during subsequent processing, then the final LFq is set to the maximum value (as if QUP=HLFM). Non-limiting examples of the maximum percentage is 95% and maximum value is 1.

Any appropriate values and/or percentages may be used. The setting may be for a single event, iteratively until he conditions abate (e.g, LFq remains at the maximum value until it drops below the maximum percentage), or for a fixed number of iterations. The percentages and values can be fixed or variable.

The second factor, referred to herein as the existence time load factor, represents the time spent by a message in the application for its processing. It is preferably updated every time a message is processed according to the following formula:

$$LFet=(ATT-TTT)/TTS$$

Where:
LFet is the existence time factor;
Average Transaction Time (ATT) is the average (preferably on a 2 seconds integration period) transaction time (time between the receipt of the message query and the reply to the message) computed by the application;
Transaction Time Threshold (TTT) is user or operator defined preset minimum time; and
Transaction Time Scale (TTS) is a configurable parameter that defines how fast the load factor reacts to an increase in transaction time.

If the ATT is lower than TTT, then the load factor is set to a minimum value. This value is preferably 0.

Based on the above computations, the total load factor is given by the following formula:

$$LF=WqLfq+Wet\ LFet$$

Wq and Wet are customizable weights (multiplication factors) that permit customization of the system. Any weights may be applied, including a weight of one.

The load factor is preferably updated for each message processed, and reported to the ESB when returning the reply message.

Referring now to FIG. 1, the ESB 110 has one or more routers 120 (referred to herein collectively as "router") tasked with load balancing. The router manages one or more routes, where each route handles one or more destinations. The router selects a route based on the message to distribute, and then applies load balancing algorithm methodology.

Each time a message must be sent on a route, the router 110 sends the message on the first eligible destination based on the decision variable. If there is no network connection established for the chosen destination, the algorithm continues the loop until it finds a connected destination; if no destination is still found, the ESB 110 replies with an error message indicating that no destination is reachable.

Each destination associated to a route has a static weight, which is statically set by configuration. By default, a load factor equal to 0 is associated to each static weight. The dynamic weight is the static weight multiplied by (1—load factor). The load factor is calculated using the methodology noted herein.

Each destination is associated with a decision variable to determine if the destination is eligible to send a message. This decision variable is preferably the number of messages already sent to this destination minus the theoretical number of messages which should have been sent, based on the weight repartition; a message can be sent to a destination only if this difference is negative.

Figure 2:
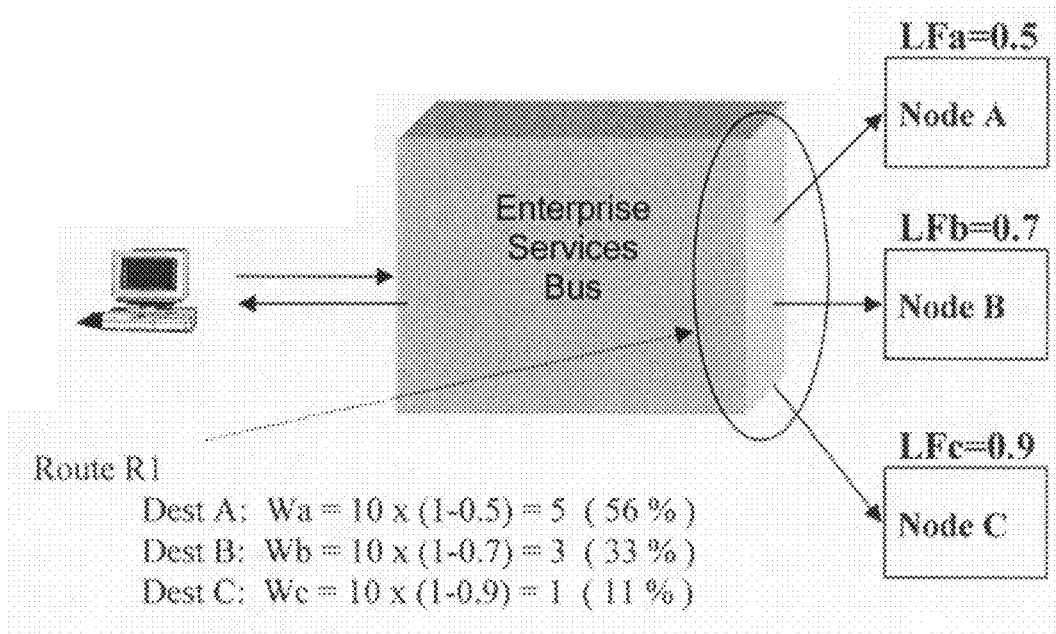
FIG. 2 is an overview of an embodiment of the invention with unequal load factors.
Figure 3:
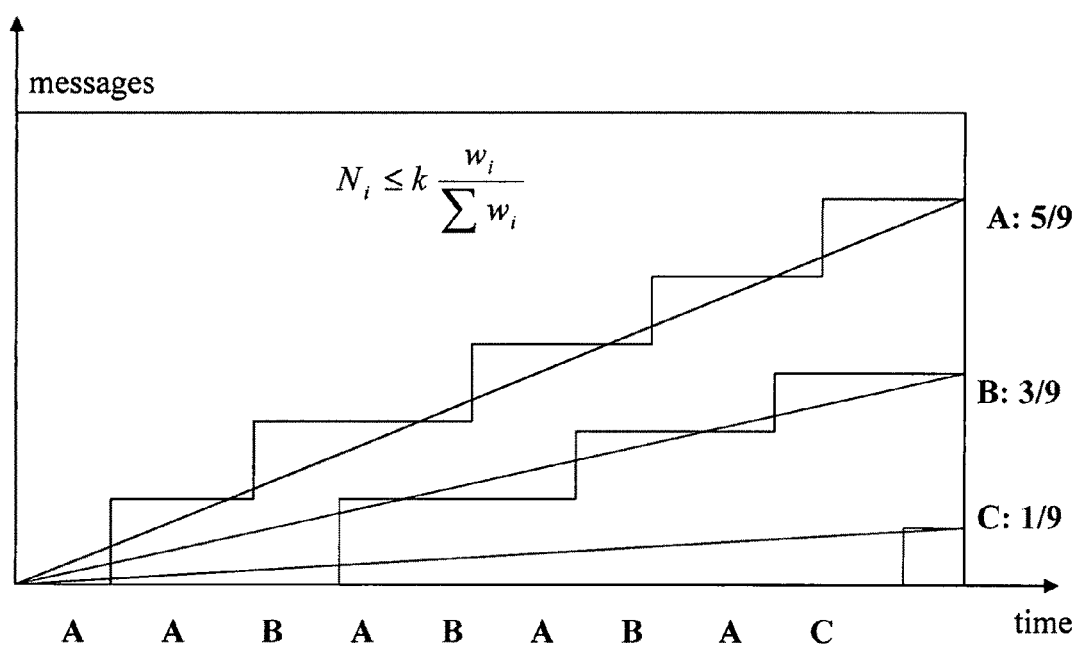
FIG. 3 is a graph showing message distribution for the embodiment of FIG. 2.

An example of the operation of an embodiment of the present invention is shown in FIGS. 1-3. In each case, a route consists of a set of destinations, and a weight affects the traffic flow of each destination of the route. In the embodiment, the application reached by the route R1 is distributed on three nodes A, B and C. So on the ESB side, the route R1 contains 3 destinations to reach the 3 application nodes. The load factor computed on each node (LF=WqLfq+Wet LFet discussed above) is reported to the ESB, which affects the weights assigned to each destination. Since the load factor in this example is zero, equal weights W are assigned to the individual destination nodes as follows:

Dest A: Wa=10

Dest B: Wb=10

Dest C: Wc=10

Messages are distributed to the nodes based on the above weights and the following formula:

$$N_i \leq k \frac{w_i}{\sum w_i}$$

where:
k is the number of messages already received by the ESB (corresponding roughly to the time);
$N_i$ is the number of messages already sent to the destination I;
and $W_i$ is the weight of destination i.

Application of the equation ensures that the number of messages already sent on a destination I doesn't exceed a theoretical value, proportional to the weight of this destination. In this case, the equal weights of the destinations creates an equal distribution of messages (e.g., 33%) to each destination node.

Referring now to FIG. 2, messages accumulating in various queues associated with the nodes induce a corresponding change in the various load factors. FIG. 2 shows an example in which the load factor for nodes A, B, and C increase from 0 to 0.5, 0.7, and 0.9, respectively. This changes the weight of the different destinations, as follows:

Dest A: $Wa$=10×(1−0.5)=5

Dest B: $Wb$=10×(1−0.7)=3

Dest C: $Wc$=10×(1−0.9)=1

Based on these weights, 56% (5/9) messages must be sent to the node A, 33% (3/9) messages must be sent to the node B, and 11% (1/9) of messages must be sent to the node C. The resulting distribution is shown in FIG. 3.

The three diagonal lines in FIG. 3 represent the theoretical flow of messages to each destination. The three stepped curves represent the real flow (each step corresponds to a message being sent to a destination). The resulting load balancing methodology therefore approximates a line with a stepped curve. This allows the Bresenham algorithm to be used to perform fast computation with integer numbers instead of floating point numbers.

An optional feature of the above methodologies is throttling, in which low-priority messages are disregarded when the overall application is overloaded. For example, if the load factor of all the destinations behind a route exceeds a given load factor threshold, all the messages matching some criteria (service type or originator for instance) are discarded.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for routing messages in a system, comprising:
determining an initial distribution pattern for routing the messages to different destinations;
determining a queue parameter based on at least a current amount of system use and a maximum potential system use of a target site at a destination;
determining a time parameter based on an amount of time that a message in an application at the destination has been waiting for its processing;
determining a load parameter based on a combination of the time parameter and the queue parameter; and
modifying the initial distribution pattern based on the following formula:

$Wd(i)=Ws(i)(1-LF(i))$ where:
Ws(i) is a weight as set by the initial distribution pattern for a particular destination P(i) in a route;
LF(i) is the load parameter for the particular destination; and
Wd(i) is an updated weight, for the particular destination P(i) in the route, for revising the distribution pattern;
wherein the route consists of a set of destinations, and the weight affects data flow to each destination of the route; and
wherein:
the load parameter for a particular destination, LF(i), is computed by applying the formula:

$LF(i)=Wq\, LFq+Wet\, LFet$ where:
Wq and Wet are customizable weights that permit customization of the system;
LFq is an initial queue load factor; and
LFet is an initial time existence factor;

said determining the queue parameter, which is based on the initial queue load factor, comprises applying the formula:

$LFq = QUP/HLFM$ where:
LFq is the initial queue load factor;
HLFM is a preset percentage of the maximum number of messages that a queue can process; and
QUP represents the number of messages in the queue as compared to its capacity; and said determining the time parameter, which is based on the initial time existence factor, comprises applying the formula:

$LFet = (ATT - TTT)/TTS$ where:
LFet is the initial time existence factor;
ATT is calculated based on the average transaction time computed by the application;
TTT is a predetermined minimum time; and
TTS is a configurable parameter that defines how fast the load factor parameter reacts to an increase in transaction time.

2. The method of claim 1, wherein said determining the queue parameter, said determining the time parameter, said determining the load parameter, and said modifying are recursive.

3. The method of claim 1, wherein said modifying is in response to changes in the system on a substantially real time basis.

4. The method of claim 1, further comprising disregarding messages matching predetermined criteria during periods of system overload.

5. The method of claim 1, wherein said determining the queue parameter comprises setting the queue parameter to the initial queue load factor when the initial queue load factor is within a certain range.

6. The method of claim 1, wherein said determining the queue parameter comprises setting the queue parameter to a predetermined value when the initial queue load factor is below a certain range.

7. The method of claim 1, wherein said determining the queue parameter comprises setting the queue parameter to a predetermined value when the initial queue load factor is above a certain range.

8. The method of claim 1, wherein said determining the time parameter comprises setting the time parameter to the initial existence time factor when the initial existence time factor is within a certain range.

9. The method of claim 1, wherein said determining a time parameter comprises setting the time parameter to a predetermined value when the initial existence time factor is below a certain range.

10. The method of claim 1, wherein said modifying is based on at least a combination of the time parameter and the queue parameter.

11. The method of claim 1, wherein said modifying is based on at least a weighted combination of the time parameter and the queue parameter.

12. The method of claim 1, wherein the load parameter is based on at least a weighted combination of the time parameter and the queue parameter.

13. The method of claim 1, further comprising:
determining a period of system overload; and
disregarding, during the period, messages that match predetermined criteria.

14. The method of claim 1, wherein the method relies upon a line-drawing Bresenham algorithm to compute in substantially real time a distribution of messages.

15. The method of claim 1, wherein said modifying further comprises applying the formula:

$$N_i \leq k \frac{w_i}{\sum w_i}$$

where k is the number of messages already received by an ESB, $N_i$ is the number of messages already sent to a destination i, and $W_i$ is the weight of destination i; and messages are distributed to the destinations based on said weights.

* * * * *